UNITED STATES PATENT OFFICE.

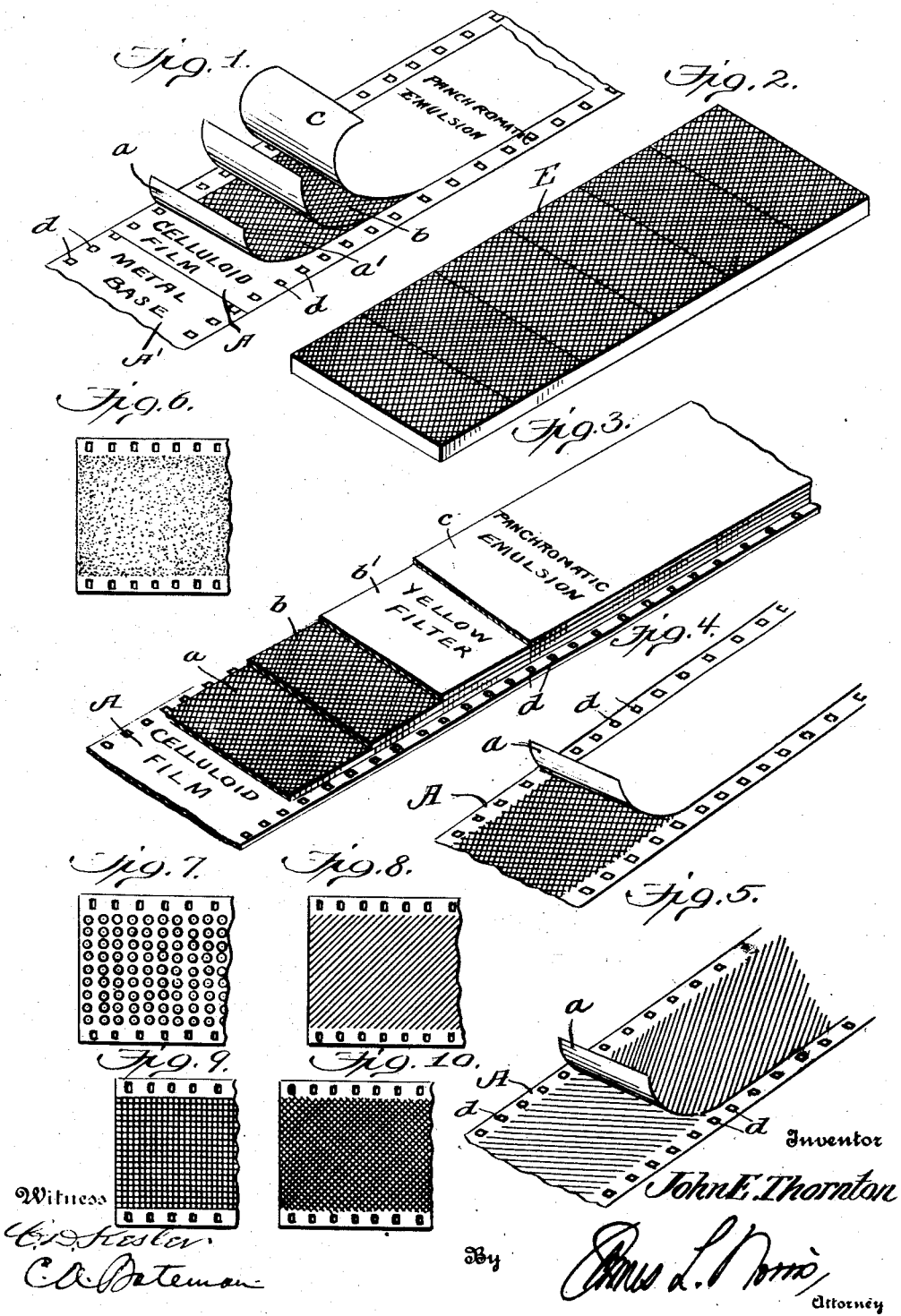

JOHN EDWARD THORNTON, OF WEST HAMPSTEAD, LONDON, ENGLAND, ASSIGNOR TO JOHN OWDEN O'BRIEN, OF MANCHESTER, ENGLAND.

MULTICOLOR FILM.

1,281,714.  Specification of Letters Patent.  Patented Oct. 15, 1918.

Application filed May 24, 1915. Serial No. 30,170.

*To all whom it may concern:*

Be it known that I, JOHN EDWARD THORNTON, a British subject, residing at West Hampstead, London, England, have invented certain new and useful Improvements in Multicolor Films, of which the following is a specification.

This invention relates to color screens, and more particularly to the type which are printed mechanically with dots or other figures, lines or cross lines.

Such screens have been prepared in a number of ways and with a variety of shapes of dots or figures or lines printed or ruled on a film or support and coated with a sensitive or panchromatic emulsion.

My invention, which is especially suitable for cinematograph films, consists in superimposing upon the film base two, three or more absorbent layers or strata, one for each color, printing upon each layer the dots, lines or figures of one color of the screen, providing a metal or other non-extensible support for the film base during the operation, and in so disposing the screen, dots, lines or figures of each picture space relatively to the preceding picture space that the screen markings on one picture space may be somewhat to one side or somewhat in advance of the screen markings on the adjacent picture spaces when viewed in relation to the pictures thereof.

In the accompanying drawing—

Figure 1 is a perspective view of a color screen embodying the invention;

Fig. 2 is a perspective view of an intaglio printing plate; and

Fig. 3 is a perspective view, partly in section, showing a multi-color film made in accordance with the present invention.

Fig. 4 is a perspective view showing a modification in which the pattern is printed directly on the celluloid base.

Fig. 5 is a perspective view showing a further modification in which the pattern is printed partly on the celluloid base and partly on the colloid sub-stratum.

Figs. 6 to 10 inclusive, illustrate diagrammatically different forms or designs of screen patterns which may be used.

I will now describe its application to cinematograph films, the same method being suitable for camera roll films, flat films, paper, and transfers for glass plates.

The transparent celluloid base A is first coated with an adhesive substratum $a$ containing a suitable colloid, such as gelatin, fish glue, albumin, or the like, the coating when dry being of exceeding tenuity. If the image is to be subsequently transferred to another surface this substratum may be omitted.

Onto this substratum $a$ the multi-color-screen is formed by mechanically printing thereon a large number of fine lines, squares, circles, dots, or other pattern, in two, three, four, or more different colors, but evenly intermixed or interspaced one with another. The dyes used must be those having an affinity for colloids.

Another similar substratum $b$ is then coated over the printed screen.

And after that the whole is coated in the dark with a layer of panchromatic gelatino-silver-bromid negative emulsion $c$ of high speed.

If desired, a yellow filter may, as shown in Fig. 3, be interposed between the multi-color-screen and the panchromatic emulsion, in order to reduce the intensity of light acting through the blue dots of the multi-color-screen. This yellow filter may conveniently be formed by adding yellow to the substratum $a$ or by staining the celluloid A itself.

The film is then ready for exposure in the usual way, through the celluloid and the multi-color-screen, on to the sensitive emulsion $c$—the celluloid A being toward the camera lens and the sensitive emulsion away from it.

For making positive reproductions, a similar multi-color-screen film, but coated with a slow speed positive instead of negative emulsion, and also rendered panchromatic, is exposed (again through its multi-color-screen) to the color negative already made upon the negative film. The exposure can be made by contact, or through a lens, or at a distance at the end of a tube or box to secure parallel rays. Any suitable printing light may be used.

If desired the pattern may, as shown in Fig. 4 be printed direct on to the celluloid itself, in which case dyes are used that have an affinity for collodion or celluloid (celluloses).

Or in another alternative, as shown in Fig. 5 the pattern may be formed partly on the celluloid by "cellulose" dyes, and partly on the colloid substratum *a* by "colloid" dyes.

When colloid dyes are used they must be mordanted after printing in order to fix them as insoluble lakes.

Where the screen pattern consists of dots (Fig. 6), circles (Fig. 7), or other mosaic, or of juxtaposed alternating lines (Fig. 8), it is necessary that the prints of the separate colors shall register with accuracy; in fact the allowable amount of error in registration should not exceed the ten thousandth part of an inch.

But this necessity for registration can be entirely avoided by crossing the lines longitudinally and laterally of the films length to give square dots as shown in Fig. 9, or crossing them diagonally to give diamond shaped dots, as shown in Fig. 10, provided the transparent spaces between these differently colored lines are filled in afterward by staining with a suitable dye that will not stain the colored lines.

In manufacturing the multi-color screens by methods previously suggested the lines or other patterns have been formed by one of the following methods:—

(1) By coating the plate with a bichromated colloid, exposing to light under a negative bearing the design, and developing, drying, and repeating the operation for each color. (2) By applying a resist or pattern in greasy ink, resinous substance, or equivalent waterproof substance. The bare spaces between are dyed up, the resist dissolved off, and another section of the pattern applied and the process repeated. (3) By coating the plate with a sticky layer then blowing thereon a mixture of colored grains of starch, gelatin, resin or the like, until covered with a uniform layer of the colored particles. (4) Mechanically by ruling lines with a ruling machine, or printing dots or lines by relief blocks. In both methods the ink or color is liable to be squeezed out during the impression so that irregular edges of greater thickness of color are formed, accompanied by centers of lesser color. Another objection was due to irregular intensity caused by the relief blocks picking up and applying a varying quantity of color, according to speed of printing, temperature, viscosity of ink or color, and also the degree to which the relief blocks were worn by use. All these factors affect uniformity of results, and a slight variation in the depth of colors on the multi-color screen affects the screen's filtering power enormously, the question of amount of color is of paramount importance.

There are many modifications of these methods, but generally they may be classed into one or the other of the above four groups.

I overcome all these difficulties by applying the color by means of intaglio-engraved plate E, the lines, dots, or other design being filled with ink or color of a fixed consistency, applied always at a uniform temperature, and the surplus color wiped from the surface of the engraved plate or roll.

In this way an exact measured quantity of color is applied every time, because the engraved lines act as color measures which always measure out and apply an exact quantity. Therefore the color intensity of the printed design is always the same.

The colors used may be varied to suit the process employed. For instance, if to be applied to a gelatin substratum as already explained, they may consist of dyes soluble in water or alcohol, with just sufficient stiffening material mixed therewith as will prevent them running. This may be starch, fish glue, gelatin, gum, albumin or the like. And if to be applied direct to the celluloid base they may consist of dyes soluble in alcohol, acetone, ether, amylacetate or the like.

The color is transferred from the engraved plate to the prepared film surface, into which it soaks until entirely absorbed.

But if the process adopted is one that requires the film to be dyed up in blank spaces between lines or dots of resist, I may mix the colors with any suitable material capable of resisting the attack of solvents used for the dyes, such as resin, gelatin, or the like.

But the material I prefer is fish-glue, combined with dye, which will be transferred to and remain attached to the film. This is then mordanted with alum, ferric chlorid, or a bichromate, which may, if desired, be exposed to light to render it insoluble.

Where it is desired that the colors should sink into the film instead of standing raised upon its surface a fresh coating, forming an infinitesimally thin layer of gelatin or celluloid (according to dyes used) is applied to the film as a substratum, between each printed color; therefore each color applied has a perfectly clean bare surface upon which it can be printed without danger of contamination of one color by another.

An objection sometimes raised against the appearance of color photographs formed by the aid of multi-color screens, especially when magnified by a projecting lantern, is the grain or "screeny" effect.

This can be overcome to a certain extent by using a design of irregular pattern, instead of the regular pattern hereinbefore referred to.

But for cinematograph films I secure the desired effect to the observer's eye by the following method. Each picture space of the film (which space is one inch wide by three quarters of an inch high) has its screen design printed in a different position from the adjacent one. This is done by placing each successive printing plate or engraved section in a different position laterally, (and also if desired longitudinally) so that the successive impressions are "staggered." For lines or dots 200 to the inch a displacement of one six hundredth of an inch for each picture before repeating will give sufficient variation to confuse the eye of the observer and destroy the "screeny" effect, but a much greater displacement may be adopted with good results. The effect of this device is that instead of all the red lines and green lines being always in the same place, they will change about, the green occupying the position occupied by red in an earlier picture, while in other pictures the displacement will be half way with an overlapping effect.

Any number of displacements may be adopted, but I find two are generally sufficient so that they alternate, the original position being repeated on the first and third pictures and so on.

To insure accuracy of register in printing the cinematograph film may be fed forward in the usual way by the perforations *a* therein.

But the method I prefer temporarily cement the celluloid film to a rigid metal surface to which it remains securely attached until every color impression has been completed. The cement used is rubber, or an adhesive gelatin mixture, or even a liquid such as water or glycerin may be used.

The endless metal belt A' is perforated near its edges corresponding with the perforations in the film A. This metal belt, with its attached film, is moved forward step-by-step any designed length at a time.

For printing from engraved curved plates or engraved rolls I use a continuous movement. The film is temporarily cemented to a large drum which rotates about its axis, and at intervals around its periphery are placed the required number of engraved rolls. These are inked by plush-covered doctor rollers rotating in troughs of ink, which pick up the ink and apply it to the engraved rolls. The latter then in process of rotation meet a scraper or doctor knife, made of rubber, metal, or any suitable material. This cleans all ink off the engraved roll except that contained in the intaglio design. As the machine rotates these rolls press against the film and transfer the design thereto, and thus the various colors are applied.

For accurate register work the printing rolls are geared most accurately with the drum so that there is no backlash to either, and each roll is capable of being moved endwise on its shaft.

A film cemented to a metal or inextensible surface during printing cannot shift, creep, expand, or contract until it has been stripped from its holding drum or moving belt, whereupon it will undoubtedly immediately alter in size, but before that all impressions will have been accurately registered thereon.

Other methods of holding may be used if desired, but I far prefer to secure it all over by its back.

What I claim as my invention and desire to protect by Letters Patent is:—

1. The improved manufacturing process for preparing color screens of the type referred to, which consists in preparing or coating a base with an absorbent substratum and printing thereon one color pattern of the screen in color which will sink in or be absorbed therein, coating the substratum after being printed upon with a layer or stratum of similar material and printing another color pattern of the screen thereon and repeating such operation for any desired number of colors, each absorbent layer being such as will amalgamate with or adhere tenaciously to the base and each other to prevent stripping.

2. A color screen of the type referred to, comprising a base, an absorbent substratum thereon, one color pattern of the screen printed thereon and the color absorbed therein, a layer or stratum of similar material upon the first printed layer and a second color pattern of the screen printed thereon and the color absorbed therein.

3. In the production of photographic films paper and plates of the type known as "screen-plate" also as "multi-color screen," in which a design of multi-colored pattern in fine sub-division forms the color filter printing or applying the said design to the support mechanically as distinct from photographically, before applying the panchromatic emulsion to the film substantially as described.

4. In the production of photographic films paper and plates of the type known as "screen-plate" also as "multi-color screen," in which a design of multi-colored pattern in fine sub-division forms the color filter applying the design to the film mechanically from an engraved surface—as distinct from photographically,—and subsequently coating the film with a layer of panchromatic emulsion over the screen substantially as described.

5. In the production of photographic films, paper and plates of the type known as "screen plates," also as "multi-color-screen," in which a design of multi-colored pattern in fine sub-division forms the color filter substratum, mechanically printing finely subdivided figures thereon to form the screen, coating an adhesive layer over the printed screen and finally coating with a layer of panchromatic gelatino-silver-bromid emulsion.

6. In the production of photographic films paper, and plates of the type known as "screen-plate" also as "multi-color-screen," in which a design of multi-colored pattern in fine sub-division forms the color filter coating a transparent base of celluloid with an adhesive substratum, mechanically printing finely sub-divided figures thereon to form the screen, coating an adhesive layer over the printed screen and finally coating with a layer of panchromatic gelatino-silver-bromid emulsion with a yellow filter interposed between the multi-color screen and panchromatic emulsion substantially as described.

7. In the production of photographic films paper and plates of the type known as "screen-plate" also as "multi-color screen," in which a design of multi-colored pattern in fine sub-division forms the color filter, the application of a substratum protecting layer after the first and between each succeeding color, whereby such substratum becomes an integral part of the original flexible support, receives the impression of the succeeding color, and keeps the several colors isolated to prevent contamination of each other.

8. In the production of photographic films paper and plates of the type known as "screen-plate" also as "multi-color screen," in which a design of multi-colored pattern in fine sub-division forms the color filter, a flexible film of one united homogeneous piece, composed of several layers each bearing a sectional print of the finished design in a different color, the said layers being composed of a material that will flow upon and unite firmly to the main support and thus become a part of it.

In testimony whereof I have hereunto set my hand in presence of two subscribing witnesses.

JOHN EDWARD THORNTON.

Witnesses:
H. D. JAMESON,
O. J. WORTH.